United States Patent [19]

Singleton et al.

[11] Patent Number: 5,922,417

[45] Date of Patent: Jul. 13, 1999

[54] POLYMERIC SHEET

[75] Inventors: Raymond William Singleton, Cirencester; John Anthony Cook, Faringdon; Kenneth Gargan, Swindon, all of United Kingdom

[73] Assignee: Scimat Limited, United Kingdom

[21] Appl. No.: 08/170,369

[22] PCT Filed: Jul. 9, 1992

[86] PCT No.: PCT/GB92/01245

§ 371 Date: Jan. 5, 1994

§ 102(e) Date: Jan. 5, 1994

[87] PCT Pub. No.: WO93/01622

PCT Pub. Date: Jan. 21, 1993

[30] Foreign Application Priority Data

Jul. 9, 1991 [GB] United Kingdom .................. 9114797
Apr. 24, 1992 [GB] United Kingdom .................. 9208906

[51] Int. Cl.$^6$ ................................ B05D 3/06; H01M 2/16
[52] U.S. Cl. .................... 427/558; 427/400; 427/393.5; 442/171; 429/254
[58] Field of Search .......................... 429/254; 428/290; 427/558, 400, 393.5; 442/171, 170, 164

[56] References Cited

U.S. PATENT DOCUMENTS

| | | |
|---|---|---|
| 3,341,366 | 9/1967 | Hogdon, Jr. et al. . |
| 3,615,865 | 10/1971 | Wetherell ................................ 429/254 |
| 4,122,133 | 10/1978 | Bernstein et al. .................. 429/254 X |
| 4,287,275 | 9/1981 | Davis ..................................... 429/254 X |
| 4,339,473 | 7/1982 | D'Agostino et al. ............... 429/254 X |
| 4,346,142 | 8/1982 | Lazear . |
| 5,024,767 | 6/1991 | Kubo et al. . |
| 5,077,082 | 12/1991 | Katoh et al. ............................ 427/558 |
| 5,089,360 | 2/1992 | Kanno et al. ........................... 429/254 |

FOREIGN PATENT DOCUMENTS

| | | |
|---|---|---|
| 0221645 | 9/1986 | European Pat. Off. . |
| 0 316 916 | 5/1989 | European Pat. Off. . |
| 39 10 874 A1 | 4/1989 | Germany . |
| 55-59659 | 10/1978 | Japan . |
| 57-73027 | 10/1980 | Japan . |
| 62-176518 | 1/1986 | Japan . |
| 62-268900 | 5/1986 | Japan . |
| 1-221573 | 3/1988 | Japan . |
| 88135432 | 6/1988 | Japan . |
| 88210143 | 8/1988 | Japan . |
| 136231 | 7/1989 | Japan . |
| 92192256 | 7/1992 | Japan . |
| 1461388 | 1/1977 | United Kingdom . |
| 1505877 | 3/1978 | United Kingdom . |

OTHER PUBLICATIONS

Zhang Pei Yao and Bengt Ranby, "Surface Modification by Continuous Graft Copolymerization. IV. Photoinitiated Graft Copolymerization onto Polypropylene Fiber Surface," Journal of Applied Polymer Science, vol. 41, 1469–1478 (1990). (no month).

B. Ranby, Z. M. Gao, A. Hult, and P.Y. Zhang, "Modification of Polymer Surfaces by Photoinduced Graft Copolymerization," American Chemical Society (1988), pp. 168–185. (no month).

Akira Kitas, Seiji Yoshida and Shiro Tanso, "Characteristics of Large Sealed Ni–Cd Batteries with Grafted Nonwoven Fabrics Seperator," pp. 413–419. (no date).

Primary Examiner—John S. Maples
Attorney, Agent, or Firm—Lerner, David, Littenberg, Krumholz & Mentlik, LLP

[57] ABSTRACT

A polymeric sheet, which is particularly suited for use as a separator in an electrochemical device, is formed by graft copolymerising acrylic acid, or another vinyl monomer capable of reacting with an acid or a base to form a salt directly or indirectly with fibers of a non-woven sheet, whose outer surface is provided by a polyolefin, especially polypropylene. The polyolefin is crosslinked as a result of the polymerisation reaction. The polymerisation reaction is preferably initiated by exposure of the sheet to ultraviolet radiation, after impregnation with an appropriate solution of the vinyl monomer.

17 Claims, No Drawings

POLYMERIC SHEET

The present invention relates to a polymeric sheet and to a method of making a polymeric sheet. The sheet is wettable by aqueous solvents, and is suitable for use in applications where ionic conduction is required, for example as an electrode separator in an electrochemical device.

Separators for use in electrochemical devices such as electrochemical cells are required to permit migration of ionic species for electrochemical reaction on electrode surfaces, and in some cases gases, while presenting a barrier to migration of electrode material between electrodes of a device. Separators can be substantially non-porous for certain applications, when ion migration takes place by an ion exchange mechanism. For certain applications, electrode separators are porous, so that ion migration can take place in liquid electrolyte which impregnates the pores of the separator.

An electrode separator should be capable of withstanding significant levels of physical maltreatment, including being subjected to physical shock such as when a device incorporating the separator is subjected to vibration or is dropped. A separator will sometimes be required to be capable of allowing passage of gas through it. The material of the separator should also be chemically stable towards materials encountered in the device, whether present for electrochemical reaction, or as the product of such a reaction.

In order that the electrochemical characteristics of a device remain substantially constant over a period of time, it is preferred that the ability of ions to migrate through the separator of a device should remain substantially constant. In the case of a porous separator, the material of the separator should be wettable by the device electrolyte, and the wettability of the separator material by the electrolyte should remain substantially constant with time.

It would appear that certain polyolefin materials have certain physical properties which would make them suitable for use in the manufacture of electrode separators. A difficulty arises, however, in that such materials are not inherently wettable by aqueous electrolytes. Such electrolytes are therefore unable to penetrate the pores of an electrode separator formed from such a material, so that ion migration through the pores in solution is not possible. This problem is sometimes overcome by treating the polyolefin material with a surfactant which allows an aqueous electrolyte to wet the material. However, such surfactant can be removed from the surfaces of the polyolefin material when electrolyte is lost from the device, for example during charging and discharging cycles, and it is not subsequently replaced on the material when the electrolyte is replenished.

This problem has been addressed by modifying the surface properties of polyolefin materials used to form polymeric sheets, for example for use as electrode separators, by graft-copolymerising to those surfaces a monomeric substance which, after co-polymerisation, confers hydrophilic properties and, in some cases ion exchange properties, on the polyolefin substrate. This technique has been found to be practicable when the porous substrate is formed from polyethylene, which has been found to lend itself well to a graft-copolymerisation reaction of this kind. However, it has been found that, when such a reaction is attempted using polyolefin materials other than polyethylene, the rate of the grafting reaction is reduced significantly.

JP-A-82.141862 (Yuasa Battery Company Limited) discloses a separator for a battery, comprising a vinyl monomer which is graft-copolymerised on a non-woven fabric of fibres, the fibres comprising polypropylene resin with a coating of polyethylene resin on their surfaces. Such fibres are formed by co-extrusion. The use of composite fibres of this type allows a separator to be formed which has physical properties which are characteristic to some extent of a separator formed from polypropylene. However, the disclosed separator has the significant disadvantage that manufacture of the co-extruded polyethylene-polypropylene fibres is complicated, and relatively expensive.

In one aspect, the invention provides a polymeric sheet which comprises a fabric formed from fibres whose surface is provided by a crosslinked polyolefin with groups bonded to it resulting from a graft-polymerisation reaction between the fibre surface and a vinyl monomer capable of reacting with an acid or a base to form a salt directly or indirectly, the ion exchange capacity of the sheet (IEC meq.g$^{-1}$) and the gel fraction (G%) of the crosslinked material of the fibres satisfying the condition:

$$IEC \leq 0.002G + 0.05.$$

It has been found that a polymeric sheet which has the features specified above has a combination of properties which makes it suitable for use as an electrode separator, with the ion exchange capacity which is required for the sheet to be wettable so that it is capable of permitting sufficient ionic conduction through electrolyte contained within it. Moreover, the separator has been found to have a degree of creep resistance, stiffness, abrasion resistance and resistance to cutting through which allow it to withstand maltreatment prior to and during use, for example during the course of assembly of an electrochemical device. The physical properties of the membrane can enhance the ability of the sheet to prevent migration of particles of material, for example in the form of dendrites, through it when it is in use, for example in an electrochemical device as a separator.

The combination of ion exchange capacity and physical properties which are present in the polymeric sheet of the present invention have been found to result from a process of manufacture involving irradiation using ultraviolet radiation under conditions which are described in greater detail below. The combination of properties is associated with polymeric sheets which have significant advantages, both in terms of the sheets themselves and the method by which they are made.

The ion exchange capacity of the polymeric sheet is measured in meq.g$^{-1}$ according to the test routine referred to below. The gel fraction is measured according to ASTM D2765-84. Preferably, the gel fraction is at least about 5%, more preferably at least about 10%, especially at least about 15%.

Preferably, the fabric is a non-woven fabric.

Preferably, the material of the surface of at least some of the fibres, for example at least about 40% by weight, preferably at least about 60%, more preferably at least about 80%, comprises polypropylene. It has been found that a sheet can be made from fibres with a surface which comprises polypropylene having the features referred to above, and that it can be made by a process which is quick and efficient.

Preferably, the material of at least some of the fibres from which the non-woven fabric is formed, for example at least about 40% by weight, preferably at least about 60%, more preferably at least about 80%, is substantially homogeneous throughout the thickness of the fibres. It can be preferred for many applications for the material of substantially all of the fibres to be substantially homogeneous throughout their thickness, so that those fibres are formed only from polypropylene or another suitable material (with appropriate additives where necessary).

It is envisaged that the sheet of the invention may be made from non-woven fabric which is made from fibres comprising more than one material, for example more than one polyolefin, or a single polyolefin but having different physical properties in different regions of the fibres. For example, the fabric may be made from at least some fibres formed from two polymers, such as coextruded bicomponent fibres having a polypropylene core and an outer layer of polyethylene, or coextruded fibres with the components positioned side-by-side. Bicomponent fibres can be formed by sintering of particles of a first material onto a core provided by a second material; for example, particles of polyethylene may be sintered onto a core of polypropylene. The fabric might also be made from fibres containing materials having different physical properties as a result of processing or additives. For example, fibres might be used which contain a polymer which has different molecular weights or different molecular structure (arising for example from differences in tacticity) in different regions of the fibres.

Bicomponent fibres may provide substantially the entire content of the non-woven fabric, or a proportion only, for example less than about 60% by weight, perhaps less than about 40%, for example less than about 30%. A small proportion of bicomponent fibres, for example with a polyethylene outer layer or with a lower molucular weight outer layer, can serve to bind the fibres of the fabric together.

When the polymeric sheet is formed from fibres which comprise polypropylene alone, it has the advantage that its physical properties are those of a non-woven fabric formed from polypropylene fibres, which are generally to be preferred compared with those of a fabric formed from polyethylene fibres, and which are quite different from the properties of a membrane formed from a microporous polymer sheet such as might be formed for example from a blend of two materials from which one material is removed. Furthermore, the sheet of the invention can be made more conveniently, and less expensively, than a sheet formed from a non-woven fabric of fibres which comprise two co-extruded materials. A further significant advantage is that the sheet of the invention can be made from fibres whose thickness is less than that of fibres formed from more than one material by co-extrusion, because of the absence of constraints which are otherwise placed on an extrusion process when more than one material is involved. As a result, the sheet of the present invention has, in addition to the advantages which arise from the use of polypropylene fibres, the advantages of small pore size in the structure of the sheet, which in turn confers an enhanced ability to filter solid material from a solution, preventing migration of that material through the sheet. A small pore size has the additional advantage that the resulting higher capillary forces can ensure that electrolyte is retained in the pores when the sheet is in use, for example as a separator in an electrochemical device, withstanding forces exerted on the sheet which might otherwise cause the electrolyte to be displaced.

Preferably, the thickness of the fibres from which the non-woven fabric is formed is less than about 30 $\mu$m, more preferably less than about 10 $\mu$m.

Preferably, the size of the pores of the separator, as measured using a Coulter porometer, is less than about 60 $\mu$m, more preferably less than about 45 $\mu$m, for example less than about 30 $\mu$m. Such small pore sizes can be attained using small diameter fibres, such as those referred to above. The use of a separator having a small pore size has the advantage that the ability of the separator to prevent penetration of electrode materials, for example as dendrites, when in use in an electrochemical device is enhanced.

Preferably, the thickness of the sheet, measured using test method DIN 53105 which involves dropping a 2.0 kg weight onto a sample of the sheet of area 2.0 cm$^2$ at a speed of 2.0 mm.s$^{-1}$, is greater than about 100 $\mu$m, more preferably greater than about 150 $\mu$m; preferably, the thickness is less than about 600 $\mu$m, more preferably less than about 450 $\mu$m. The method by which the sheet is made may include a step of calendering the fabric to reduce its thickness to a value within the range referred to above, the reduction being by at least about 5%, preferably at least about 15%, more preferably at least about 25%, and less than about 60%, preferably less than about 45%, more preferably less than about 40%. The calendering step may take place before or after the material of the fabric is reacted with the graft-polymerisation solution. Calendering the fabric before the graft-polymerisation reaction has been found to give rise to increased rates of the reaction.

The vinyl monomer which is graft-polymerised with the polypropylene of the fibre surface can be capable of reacting with an acid or a base directly to form a salt, or indirectly to form a salt after appropriate work up, perhaps involving for example hydrolysis or sulphonation. Preferred vinyl monomers include ethylenically unsaturated carboxylic acids and esters thereof such as acrylic acid, methacrylic acid, methyl acrylate, and methylmethacrylate. Other vinyl monomers which might be used include acrylamide, vinylpyridine, vinyl-pyrrolidone and styrene-sulphonic acid.

In another aspect, the invention provides an electrochemical device, comprising an anode, a cathode, a quantity of an electrolyte, and an electrode separator of the type discussed above. Preferably, the cathode in the device comprises nickel (II) hydroxide. An example of material which can form the anode in such a device includes cadmium. Alternatively, the anode may be a metal hydride electrode. Other types of electrochemical device in which the separator of the invention finds application include secondary cells such as lead-acid cells.

In a further aspect, the invention provides a method of making a polymeric sheet, which comprises:

(a) impregnating a non-woven fabric formed from fibres whose surface is provided by a polyolefin with a solution of a vinyl monomer capable of reacting with an acid or a base to form a salt directly or indirectly, the solvent being one which does not evaporate to a significant degree in the subsequent step of exposure of the fabric to radiation, and (b) exposing the impregnated fabric to ultraviolet radiation while exposure of the fabric to oxygen is restricted to cause the monomer and the material of the fibres to co-polymerise.

The method of the invention has the advantages that a polymeric sheet can be made quickly and efficiently on a continuous basis, by virtue of the use of ultraviolet radiation to initiate graft-polymerisation of the monomer and the material of the fibres.

The use of a solvent which does not evaporate to a significant degree in the irradiation step of the method has been found to confer the advantages of providing greater uniformity of properties of the resulting sheet, throughout the thickness of the sheet. Thus there is greater uniformity in the degree of grafting throughout the thickness of the sheet, leading to improved ion exchange properties through the sheet. It is believed that this might arise at least in part because of the transparency of the sheet which is retained as a result of the retention of the solvent in the pores of the fabric. It has also been found that the degree or adverse effects or both of homopolymerisation of the vinyl monomer can be reduced by selection of an appropriate solvent.

Suitable solvents for use in the method of the invention will generally be transparent to ultraviolet radiation, have no atoms which are abstractable when exposed to radiation, have a high specific heat and a high latent heat of vaporisation, and will not react adversely with the material of the fibres of the separator. Preferred solvents will have a boiling point which is greater than about 50° C., preferably greater than about 70° C. It is also preferred that the boiling point of the solvent be no higher than a temperature at which the film might be damaged during the course of the irradiation step of the method. For example, the boiling point of the solvent might be selected to be less than the temperature at which the material of the fibres melts or softens. Particularly preferred solvents have a latent heat of vaporisation which is greater than about 1000 $J.g^{-1}$, preferably greater than about 1500 $J.g^{-1}$, more preferably greater than about 2000 $J.g^{-1}$, and/or a specific heat capacity which is greater than about 2.0 $J.g^{-1}.K^{-1}$, preferably greater than about 3.0 $J.g^{-1}.K^{-1}$, more preferably greater than about 4.0 $J.g^{-1}.K^{-1}$. A value of specific heat capacity, or of latent heat of vaporisation, within these ranges has the advantage that the solvent in the reaction has an enhanced ability to dissipate heat without evaporating to a significant degree, giving rise to the advantages referred to above. A particularly significant further advantage is that the formation of product from the homopolymerisation reaction of the vinyl monomer is restricted, and any such product which is formed is retained in solution rather than being deposited in the pores within the sheet. This allows the product to be removed easily from the sheet by washing. The control over the formation of the homopolymerisation product can be achieved without use of inhibiting agents, which can cause contamination problems when the sheet is in use in certain applications.

Water is a particularly preferred solvent.

The ultraviolet radiation initiated polymerisation reaction can be completed surprisingly quickly, for example by exposing the impregnated fabric to radiation for as little as 15 seconds, even as little as 5 or 10 seconds, and it has been found that the fabric after reaction contains a significant amount of grafted monomer, which can be sufficient for the fabric to be rendered wettable by aqueous solutions such as might be found in certain electrochemical devices. This is to be contrasted with techniques in which graft-copolymerisation reactions are initiated using, for example, electron bombardment, either of impregnated fabric or of fabric prior to exposure to monomer solution, where reaction times of many minutes, even as long as 50 minutes, can be required in order to obtain a significant degree of grafting, and even after reaction times of this order, the degree of grafting reaction can be too low for many applications. Such prior techniques do not therefore lend themselves to continuous processing in the manner of the present invention.

Techniques by which exposure of the impregnated fabric to oxygen can be restricted include, for example, carrying out the ultraviolet irradiation step in an inert atmosphere, for example in an atmosphere of argon or nitrogen, or sealing the impregnated fabric between sheets of material which are impervious to oxygen, but are transparent to ultraviolet radiation of appropriate wavelength for initiating the co-polymerisation reaction.

Preferably, the impregnation solution includes an initiator for the polymerisation reaction. Preferably, the initiator initiates the reaction by abstracting an atomic species from one of the reacting materials, for example by abstracting a hydrogen atom from the polypropylene of the fabric fibres to create a polymeric radical. Following such abstraction, the polymeric radical, in contact with the monomer in solution, can initiate the formation of a grafted branch. When an atom is abstracted from the polypropylene of the fabric fibres, the activated polypropylene molecule can react either with another polypropylene molecule so that the polypropylene of the fabric becomes cross-linked, or with the vinyl monomer in a co-polymerisation reaction. An example of a suitable initiator is benzophenone. The mole ratio of the vinyl monomer to the initiator is preferably at least about 50, more preferably at least about 100, especially at least about 175; the ratio is preferably less than about 1500, more preferably less than about 1000, especially less than about 500, more especially less than about 350; for example the ratio may be about 200.

The impregnation solution may include a component by which homopolymerisation of the vinyl monomer is inhibited. Examples of suitable inhibitors include iron (II) and copper (II) salts which are soluble in the reaction medium, a preferred material for aqueous media being iron (II) sulphate. It has been found, however, that the need for an inhibitor can be avoided by selection of an appropriate solvent for the graft-polymerisation reaction which can restrict the speed and degree of the homopolymerisation reaction, for example as a result of its ability to act as a heat sink. This can be an advantage when it is desired to minimise the amount of contaminants in the sheet.

The impregnation solution may include additional components to optimise reaction conditions such as surfactants to ensure that the solution fully impregnates the non-woven fabric, an appropriate mixture of solvents to ensure homogeneity of the solution, and so on.

The use of ultraviolet radiation in the method of the invention allows non-woven fabrics suitable for use as electrode separators to be made economically and on a continuous basis. It has been found that sufficient energy can be supplied to an impregnated fabric for the irradiation process to be run continuously, and that the heat which is generated in such a process can be controlled by use of appropriate solvents as heat sink components.

Measurement of Ion Exchange Capacity

A sample of membrane about 0.5 g is converted into the acid ($H^+$) form by immersion in 1.0 M hydrochloric acid at 60° C. for 2 hours. The sample is washed in distilled water until the washing water shows a pH in the range of about 6 to 7. The sample is then dried to constant weight ($W_1$) at 100° C.

The dried sample is placed in a 100 ml polyethylene bottle to which is added accurately 10 ml of approximately 0.1 M potassium hydroxide. Additional distilled water can be added to immerse the sample fully. A further 10 ml of potassium hydroxide is added to a second polyethylene bottle, together with the same amount of distilled water as that added to the bottle containing the sample. Both bottles are stored at 60° C. for at least two hours.

After being allowed to cool, the contents of each bottle are transferred to glass conical flasks, and the amount of potassium hydroxide in each is determined by titration with standardised 0.1 M hydrochloric acid, using a phenolphthalein indicator.

The ion exchange capacity, measured in milliequivalents per gram, of the membrane in the dry acid ($H^+$) form is calculated according to the equation:

$$IEC = \frac{t_2 - t_1}{10W_1}$$

where $t_1$ is the titration value of HCl from bottle with the sample, $t_2$ is the titration value of HCl from bottle without the sample, and $W_1$ is the weight of the dried membrane in acid ($H^+$) form.

Examples of the manufacture of an electrode separator from a non-woven polypropylene fabric is set out below.

EXAMPLE 1

Manufacture of Separator

A non-woven polypropylene fabric made from thermally bonded endless single component polypropylene fibre, fibre diameter in the range 5 to 10 μm, was selected having a nominal thickness of 230 μm, and a weight of about 40 g.m$^{-2}$.

A piece of the fabric measuring 12 cm by 12 cm was impregnated by immersion in a solution formulated as follows (percentages by weight):

Acrylic acid 20.0%

Benzophenone 0.5%

Iron (II) Sulphate 0.1%

Lutensol ON 70 Surfactant 0.5%

Methoxyethanol 12.5%

Water 66.4%

The impregnated fabric was placed between two layers of an optically clear polyester film (thickness 75 μm). A laminate was passed through a pair of nip rollers to expel any air and excess solution from between the component layers.

The laminate was placed into a polyethylene bag to provide physical support, and the bag was sealed. The sealed bag was then passed at a speed of 0.3 m.min$^{-1}$ (so that the material of the sheet was exposed to radiation for about 20 seconds) between two medium pressure mercury vapour lamps, positioned parallel to one another. Each lamp had a power output of 120 W.cm$^{-1}$, and produced a parallel beam having a width of 10 cm. The distance between each lamp and the impregnated fabric was 8.5 cm.

Following irradiation, the fabric was removed from the bag and from between the layers of polyester film. It was then washed in water, and then in methanol, to remove unreacted components, and any homopolymerised acrylic acid which may have been formed. The fabric was then further treated in 5% by weight potassium hydroxide at 60° C. for two days, to remove any final traces of homopolymerised acrylic acid. The fabric was then finally washed with water and dried for 30 minutes at 105° C.

Properties of Separator Material

The properties of the grafted separator material are set out below, and compared with the corresponding properties of the polypropylene fabric starting material:

|  | Ungrafted | Grafted |
| --- | --- | --- |
| Ion exchange capacity (meq · g$^{-1}$) | 0 | 1.0 |
| Gel content (%) (ASTM D2765-84) | 0 | 60 |
| Machine direction tensile strength (ASTM D 882) (N · m$^{-1}$) | 2400 ± 17 | 2860 ± 175 |
| Machine direction elongation (%) (ASTM D 882) | 72 ± 10 | 63.5 ± 9 |
| Electrolyte wicking rate (time) (30% w/w KOH) (DIN 53924-78) (mm) | 60s 600s<br>0   0 | 60s 600s<br>30   70 |
| Electrolyte absorbtion (%) (AD 447301 US Air Force Manual) | Non-wetting | 184 |
| Electrical Resistance (ohm · cm$^2$) (AD 447301 US Air Force Manual) | Non-wetting | 0.042 |

The properties referred to above demonstrate that acrylic acid has been grafted to the polypropylene fabric material, so that the fabric has become wettable, and therefore suitable for use in electrochemical devices which include aqueous electrolyte.

In a further test, involving storing the separator in 40% by weight potassium hydroxide at 71° C. for 21 days, it has been found that the properties referred to above have changed only to an insignificant degree, showing that the wettability imparted to the non-woven polypropylene fabric by the grafting reaction is permanent.

EXAMPLE 2

Manufacture of Separator

A non-woven polypropylene fabric made from thermally bonded endless single component polypropylene fibre, fibre diameter in the range 5 to 10 μm, was selected having a nominal thickness of 330 μm, and a weight of about 60 g.m$^{-2}$. The fabric was calendered to reduce its thickness to about 200 μm.

A strip of the fabric on a roll was impregnated with a solution formulated as follows (percentages by weight) by passing the fabric around rollers located in a chamber with an atmosphere of nitrogen, so that the fabric passed through the solution:

Acrylic acid 30.0%

Benzophenone 0.25%

Lutensol ON 70 Surfactant 0.5%

Water 69.25%

The mole ratio of acrylic acid to benzophenone was about 150.

The impregnated fabric, still in a nitrogen atmosphere, was passed at a speed of 1.0 m.min$^{-1}$ (so that the material of the sheet was exposed to radiation for about 6 seconds) between two medium pressure mercury vapour lamps, positioned parallel to one another, one on each side of the chamber, the walls of the chamber at that point being provided by quartz windows. Each lamp had a power output of 120 W.cm$^{-1}$, and produced a parallel beam having a width of 10 cm.

The fabric was then washed in de-ionised water to remove unreacted components, and dried in an air oven for 2 minutes at 95° C.

Properties of Separator Material

The properties of the grafted separator material are set out below, and compared with the corresponding properties of the polypropylene fabric starting material:

|  | Ungrafted | Grafted |  |
|---|---|---|---|
| Ion exchange capacity (meq · g$^{-1}$) | 0 | 0.48 |  |
| Gel content (%) (ASTM D2765-84) | 0 | 33 |  |
| Machine direction tensile strength (ASTM D 882) (N · m$^{-1}$) | 3140 ± 50 | 3650 ± 175 |  |
| Machine direction elongation (%) (ASTM D 882) | 93 ± 6 | 78 ± 9 |  |
| Electrolyte wicking rate (time) (30% w/w KOH) (DIN 53924-78) (mm) | 60s  600s<br>0     0 | 60s  600s<br>30   70 |  |
| Electrolyte absorbtion (%) (AD 447301 US Air Force Manual) | Non-wetting | 350 |  |
| Electrical Resistance (ohm · cm$^2$) (AD 447301 US Air Force Manual) | Non-wetting | 0.070 |  |

EXAMPLE 3

A non-woven fabric formed from bicomponent polypropylene/polyethylene fibres (thickness 145 μm, basis weight 60 g.m$^{-2}$) was impregnated with a solution having the following composition, using the apparatus described in Example 2 above:

Acrylic acid 30.0%

Benzophenone 0.5%

Lutensol ON 70 Surfactant 0.5%

Water 69.0%

The properties of the grafted separator material are set out below, and compared with the corresponding properties of the polypropylene fabric starting material:

|  | Ungrafted | Grafted |
|---|---|---|
| Ion exchange capacity (meq · g$^{-1}$) | 0 | 0.567 |
| Gel content (%) (ASTM D2765-84) | 0 | 45.7 |
| Machine direction tensile strength (ASTM D 882) (N · m$^{-1}$) | 3512 ± 100 | 4706 ± 75 |
| Machine direction elongation (%) (ASTM D 882) | 27.6 ± 3.9 | 26.9 ± 1 |
| Electrolyte wicking rate (time) (30% w/w KOH) (DIN 53924-78) (mm) | 60s  600s<br>0     0 | 60s  600s<br>25   60 |
| Electrolyte absorbtion (%) (AD 447301 US Air Force Manual) | Non-wetting | 190 |
| Electrical Resistance (ohm · cm$^2$) (AD 447301 US Air Force Manual) | Non-wetting | 0.058 |

EXAMPLE 4

An AA size commercially available nickel-metal hydride (Misch metal electrode) cell was dismantled and its separator was replaced with one made by the method described in Example 2 above. Electrical connections were made to the electrodes, and the components of the altered cell were placed in a container having dimensions approximately equal to those of the original cell. An appropriate amount of 30% potassium hydroxide electrolyte was added to the cell components, and the cell was sealed with an epoxy resin adhesive.

The cell was charged and discharged repeatedly at a C/20 rate (that is over a cycle which involved charging for 20 hours and discharging for 20 hours), and was found to be capable of delivering 700 mAh to a 1.0V cut-off on discharge.

We claim:

1. A method of making a polymeric sheet, which comprises:

(a) impregnating a non-woven fabric formed from fibers whose surface is provided by a polyolefin with a solution of a vinyl monomer in a solvent, said vinyl monomer capable of reacting with an acid or a base to form a salt directly or indirectly, the solvent being transparent to ultraviolet radiation and, one which does not evaporate in the subsequent step of exposure of the fabric to radiation by virtue of having a latent heat of vaporization which is greater than about 1000 J/g, and (b) exposing the impregnated fabric to ultraviolet radiation while exposure of the fabric to oxygen is restricted to cause the monomer and the material of the fibers to co-polymerise.

2. A method as claimed in claim 1, in which the solvent comprises water.

3. A method as claimed in claim 1, in which the vinyl monomer comprises an ethylenically unsaturated carboxylic acid or a ester thereof.

4. A method as claimed in claim 1 which is carried out continuously.

5. A method as claimed in claim 1, in which the impregnation solution includes a component by which homopolymerisation of the monomer is inhibited.

6. A method as claimed in claim 1, in which the thickness of the fibers is less than 30 μm.

7. A method as claimed in claim 1, in which the thickness of the fibers is less than 10 μm.

8. The method as claimed in claim 1, including calendering said fabric in order to reduce its thickness.

9. The method as claimed in claim 8 wherein said calendering step is carried out subsequent to said copolymerization of said monomer and said material of said fibers.

10. The method as claimed in claim 1 wherein said polyolefin comprises polypropylene.

11. The method according to claim 10 wherein the surface of at least 40% by weight of said fibers comprises said polypropylene.

12. A method as claimed in claim 1 wherein said solvent has a latent heat of vaporization which is greater than about 1500 J/g.

13. A method as claimed in claim 12 wherein said solvent has a latent heat of vaporization which is greater than abut 2000 J/g.

14. A method of making a polymeric sheet, which comprises:

(a) impregnating a non-woven fabric formed from fibers whose surface is provided by a polyolefin with a solution of a vinyl monomer in a solvent, said vinyl monomer capable of reacting with an acid or a base to form a salt directly or indirectly, the solvent being transparent to ultraviolet radiation and, one which does not evaporate in the subsequent step of exposure of the fabric to radiation by virtue of having a specific heat capacity which is greater than about 2.0 J/gK, and (b) exposing the impregnated fabric to ultraviolet radiation while exposure of the fabric to oxygen is restricted to cause the monomer and the material of the fibers to co-polymerise.

15. A method as claimed in claim 14 wherein said solvent has a specific heat capacity which is greater than about 3.0 J/gK.

16. A method as claimed in claim 15 wherein said solvent has a specific heat capacity which is greater than about 4.0 J/gK.

17. A method of making a polymeric sheet, which comprises:

(a) impregnating a non-woven fabric formed from fibers whose surface is provided by a polyolefin with a solution of a vinyl monomer in a solvent, said vinyl monomer capable of reacting with an acid or a base to form a salt directly or indirectly, the solvent being transparent to ultraviolet radiation and, one which does not evaporate in the subsequent step of exposure of the fabric to radiation, and (b) exposing the impregnated fabric to ultraviolet radiation while exposure of the fabric to oxygen is restricted to cause the monomer and the material of the fibers to co-polymerise, whereby any of said monomer which homopolymerises is retained in solution in said unevaporated solvent.

* * * * *

UNITED STATES PATENT AND TRADEMARK OFFICE
CERTIFICATE OF CORRECTION

PATENT NO. : 5,922,417
DATED : July 13, 1999
INVENTOR(S) : Singleton et al.

It is certified that error appears in the above-identified patent and that said Letters Patent is hereby corrected as shown below:

Throughout the specification, "fibre" should read --fiber--.

Column 2, line 20, "$\leq$" should read --$\geq$--

Column 2, line 29, "allow" should read --allows--.

Column 3, line 28, "molucular" should read --molecular--.

Column 4, line 24, after "involving" insert --,--.

Column 4, line 25, after "example" insert --,--.

Column 5, lines 22, 23, "J.g1" should read --$J.g^{-1}$--.

Column 10, line 15, "a" should read --an--.

Column 10, line 38, "abut" should read --about--.

Signed and Sealed this

Fourteenth Day of December, 1999

Q. TODD DICKINSON

*Attest:*

*Attesting Officer*  Acting Commissioner of Patents and Trademarks